N. Brockway,
Drag Saw,
№ 58,586.   Patented Oct. 9, 1866.
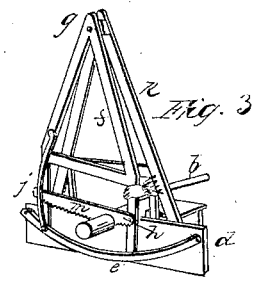
Fig. 3
Fig. 4
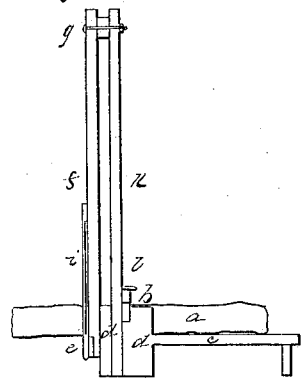
Fig. 2
Fig. 1
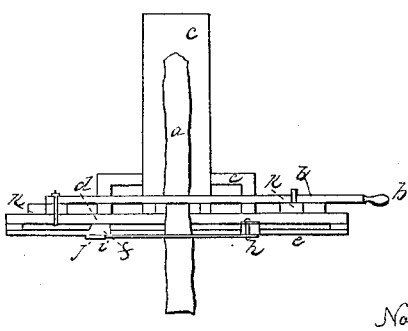
Witnesses
G. W. Hildreth
Joseph Clark
Inventor.
Nathaniel Brockway

UNITED STATES PATENT OFFICE.

NATHANIEL BROCKWAY, OF CAMBRIA, NEW YORK.

IMPROVEMENT IN SAWING-MACHINES.

Specification forming part of Letters Patent No. 58,586, dated October 9, 1866.

*To all whom it may concern:*

Be it known that I, NATHANIEL BROCKWAY, of Cambria, in the county of Niagara, in the State of New York, have invented a Machine for Sawing Wood; and I do hereby declare that the following is a full and exact description thereof, reference being had to the accompanying drawings, and to the letters of reference marked thereon, which refer to the same parts in the various figures.

Figure 1 is a plan. Fig. 2 is a side elevation. Fig. 3 is a perspective view; Fig. 4, front elevation.

The nature of my invention consists in attaching a saw to the lower part of a triangular pendulum-frame which swings upon a center at the upper end thereof. Said frame holds the saw strained, one end of the saw being hung upon a pivot-center, the other end sliding in the segment of a circle drawn from the pivot end of the saw.

To enable others skilled in the art to make and use my invention, I will proceed to describe its construction and operation.

Fig. 3 is a perspective view, showing all the parts generally. Fig. 1 is a plan, showing the stick of wood $a$ to be sawed. $b$ is the lever or binder to hold the stick $a$ fast in its place; it is also seen at $b$ in Figs. 3 and 4. $c$ is a table for the wood to rest upon. $d$ is the main sill or plank, to which the frame is built, and has an angular gash cut in it to receive the wood, as seen by dotted lines behind the saw in Fig. 4. $m$ is the saw, of any suitable size or form. E is a circular rib, behind which the legs or lower end of the triangular frame slide. The triangular frame is hung at the top on a bolt or center-pin, as seen at $g$, and as the frame is moved to the right and left the saw is passed through the wood $a$. The right end of the saw at $h$ is hung upon a center at $h$. The left end moves up and down in a slide, $i$. The curve of said slide is drawn from the center $h$. Upon the end of the saw, at $j$, is fastened projections, thickening the end of the saw, forming a shoulder to bear against the slide $i$, which sustains that end of the saw and keeps it in a strained or partially-tightened position, by which means a thinner saw can be used. This is not intended to strain the saw so tight as to prevent it from moving freely by its own gravity in the gibs or segments, as the saw cuts its way down through the stick or log, and requires no device for straining it.

Fig. 2 is a side elevation, showing the log or stick $a$, the end of the binder-table $c$, and the upright portion of the main frame K, to which the triangular pendulum is hung. $b$ is a pin to hold down the binder $b'$.

What I claim as my invention, and desire to secure by Letters Patent, is—

The segment $i$ and gibs $j$ and saw $m$, in combination, for the purposes described.

NATHANIEL BROCKWAY.

Witnesses:
G. W. HILDRETH,
JOSEPH CLARK.